United States Patent
Schmitt et al.

(10) Patent No.: US 6,330,505 B1
(45) Date of Patent: Dec. 11, 2001

(54) METHOD AND DEVICE FOR CONTROLLING THE WHEEL PERFORMANCE OF A VEHICLE

(75) Inventors: Johannes Schmitt; Thomas Isella, both of Markgroeningen; Ulrich Hessmert, Schwieberdingen; Michael Braun, Leinfelden-Echterdingen; Rainer Brueggemann, Markgroeningen, all of (DE)

(73) Assignee: Robert Bosch, GmbH, Stuttgart (DE)

(*) Notice: Subject to any disclaimer, the term of this patent is extended or adjusted under 35 U.S.C. 154(b) by 0 days.

(21) Appl. No.: 09/511,209

(22) Filed: Feb. 23, 2000

(30) Foreign Application Priority Data

Mar. 27, 1999 (DE) .............................................. 199 14 064

(51) Int. Cl.$^7$ ................................................. B60K 28/00
(52) U.S. Cl. ............................... 701/82; 701/70; 180/197
(58) Field of Search ................................ 701/70, 82, 83, 701/84, 85, 86, 90; 180/197; 303/3, 10, 191

(56) References Cited

U.S. PATENT DOCUMENTS

| | | | |
|---|---|---|---|
| 5,038,883 | * 8/1991 | Kushi et al. | 180/197 |
| 5,224,565 | * 7/1993 | Tamura et al. | 180/197 |
| 5,265,693 | * 11/1993 | Rees et al. | 180/197 |
| 5,335,744 | * 8/1994 | Takasuka | 180/197 |
| 5,575,255 | * 11/1996 | Abe et al. | 180/197 |
| 5,971,503 | * 10/1999 | Joyce et al. | 303/191 |
| 6,002,979 | * 12/1999 | Ishizu | 701/86 |
| 6,145,939 | * 11/2000 | Chang et al. | 303/3 |
| 6,168,245 | * 1/2001 | Siegel et al. | 303/10 |

FOREIGN PATENT DOCUMENTS

| | | |
|---|---|---|
| 196 51 154 | 6/1997 | (DE) . |
| 0 166 178 | 1/1986 | (EP) . |

* cited by examiner

Primary Examiner—Gary Chin
(74) Attorney, Agent, or Firm—Kenyon & Kenyon

(57) ABSTRACT

A method and device for controlling the wheel performance of a vehicle is described. Wheel performance is influenced within the scope of an operating dynamics system or an electrical brake control system. In this context, a traction control system is used. At least one quantity representing the ambient temperature or the intake air temperature of an internal combustion engine is recorded, and the traction control system is adjusted as a function of this temperature quantity to emphasize stability at low temperatures and to emphasize traction at higher temperatures. In another variant, a pre-charging pump is activated, and a return pump for pre-pressurizing the circuit is activated and/or valves for building up or reducing pressure are triggered via opening pulses. At least one quantity representing the coolant temperature, the ambient temperature, or the intake air temperature of an internal combustion engine is recorded, and as a function of this measured temperature quantity, the length of the opening pulses is changed, the pre-charging pump is activated, and/or the circuit is pre-pressurized by at least one pump.

11 Claims, 4 Drawing Sheets

METHOD AND DEVICE FOR CONTROLLING THE WHEEL PERFORMANCE OF A VEHICLE

FIELD OF THE INVENTION

The present invention relates to a method and a device for controlling the wheel performance of a vehicle.

BACKGROUND INFORMATION

Modern motor vehicles employ a plurality of feedback control and control systems to control wheel performance. An anti-lock control system, a traction control system having brake intervention and/or engine intervention, an operating dynamics controller having brake intervention and/or engine intervention, and an electrically controlled braking system (brake-by-wire) are some examples.

German Patent Application No. 196 51 154 describes a system in which the temperature of the hydraulic fluid and, thus, the temperature of the hydraulic unit of the braking system are estimated based on the after-run behavior of a pump supplying the hydraulic fluid. The valve opening times, especially in reference to the pressure build-up, are then changed as a function of the estimated temperature, so that the pressure change dynamics in the wheel brakes do not deteriorate considerably at low temperatures. However, determining the temperature of the hydraulic fluid or the hydraulic unit on the basis of the pump's after-run behavior is a relatively inaccurate method, so that this information cannot be used satisfactorily for exact control of a braking system.

European Patent No. 166 178 describes a traction control system which actuates the brakes and/or influences the engine torque when a slip threshold is exceeded due to the slip of at least one drive wheel. The manner in which the threshold values and/or the extent of the torque intervention are established results from a compromise between traction and stability, which is maintained over the entire temperature range.

SUMMARY

An object of the present invention is to provide a method and device which satisfactorily take into account the temperature conditions at the vehicle when controlling the wheel performance.

In accordance with the present invention, by taking into account the coolant temperature, oil temperature, outside air temperature, and/or intake air temperature when controlling wheel performance, this control is improved because the control can be adjusted to the temperature conditions prevailing at any one time.

Especially advantageous is the guarantee of a satisfactory estimation of the hydraulic unit temperature and, consequently, of the hydraulic fluid temperature, which is evaluated during the control of the braking system. Depending on at least one of the mentioned temperature variables, not only are the valve opening times increased advantageously in this context, but also, additionally or alternatively, the circuit is pre-pressurized by operating the return pump, and/or the inlet pressure of the return pump is increased by operating a pre-charging pump. This ensures that in response to a change in pressure, above all, a build-up of pressure, improved dynamics are attained even at low temperatures, meaning that larger gradients with a varying coefficient of friction can be overcome even in the case of a cold vehicle at low temperatures.

Especially advantageous is that due to the improvement in the pressure build-up dynamics based on the temperature estimation, there is only a limited need to use the pre-charging pump, and in extreme cases, the need is even eliminated. As a result, noise is substantially reduced and driving comfort is thereby improved. In addition, the vehicle's traction is improved at low temperatures.

Another advantage of the present invention is that in order to determine the temperature of the hydraulic unit or the hydraulic fluid, a model is used which simulates the temperature curve on the basis of existing measured temperature variables. This model is easily transferable to other vehicle types.

A further advantage of the present invention is that the model estimates the warming and cooling of the hydraulic unit on the basis of recurrence formulas, which are adjusted to the actual temperature curve. This also allows the influences on the temperature of the hydraulic unit to be considered which are, at best, difficult to describe in a physical context. Another exemplary embodiment, which can be used with or without the above-mentioned measures, has the advantage that the operating conditions and the extent of the intervention by a traction control system are varied as a function of at least one of the given temperatures. In this way, the previous compromise between better traction and vehicle stability shifts more towards higher stability in response to low outside temperatures and shifts more towards higher traction in response to high outside temperatures. This is done by altering the slip thresholds, above which the traction control system sets in (increasing them at higher temperatures) and/or by altering the magnitude of the torque change (intensifying torque changes are increased in response to higher temperatures, reductive torque changes are decreased. As a result, one attains a satisfactory controller design, since the conflict between targeting traction and stability is analyzed in a different way, i.e., as a function of temperature, so that one comes closer to resolving this conflict.

DETAILED DESCRIPTION

Figure 1:
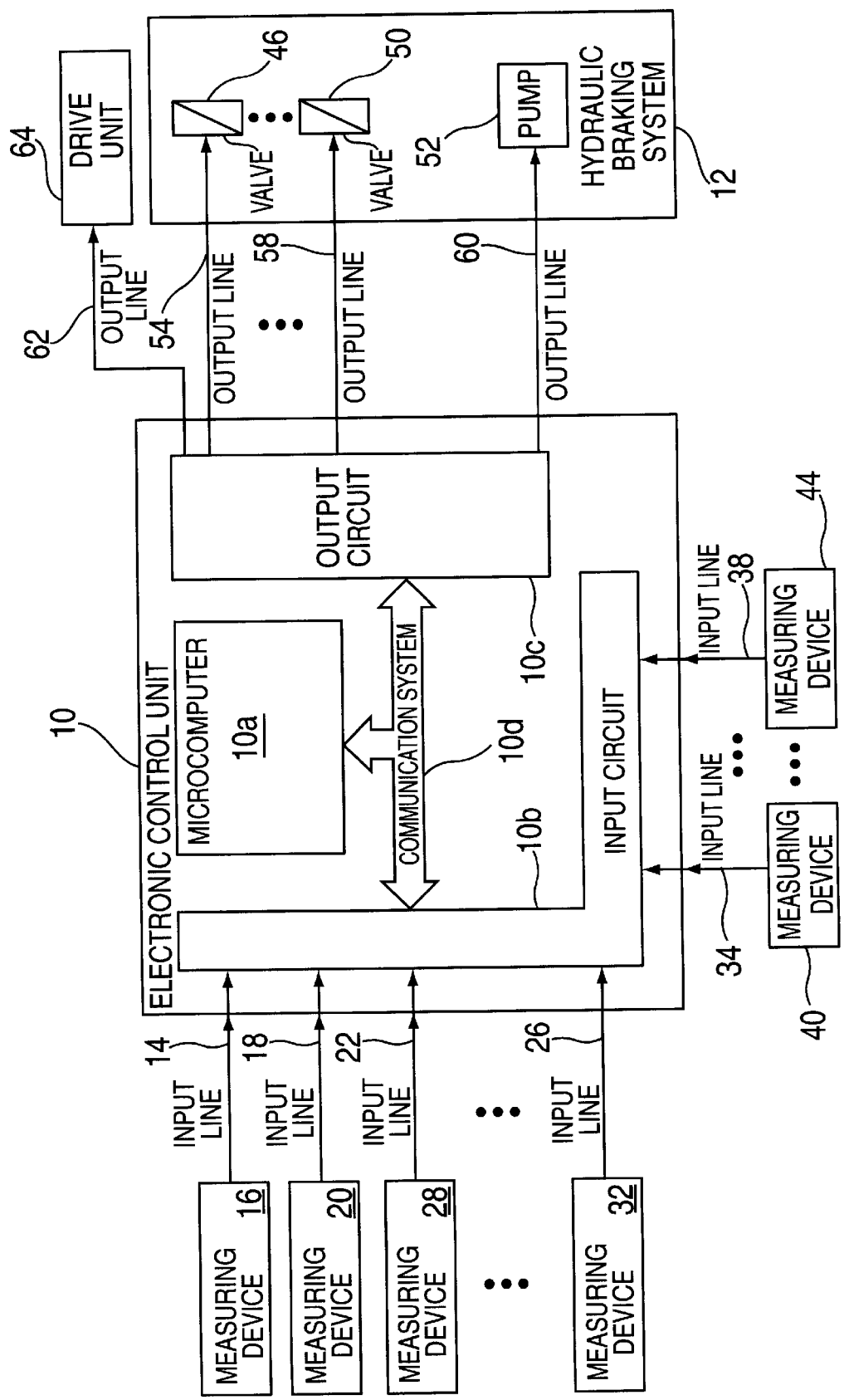
FIG. 1 shows an overview block diagram of a control device for controlling the wheel performance of a vehicle, the control unit including a traction control system and/or an operating dynamics control system with brake intervention and torque intervention.

FIG. 1 shows an overview block diagram of a control unit for controlling the wheel performance of a vehicle. An electronic control unit 10 is displayed which includes at least a microcomputer 10a, an input circuit 10b, an output circuit 10c, as well as a communication system 10d linking these components. Control unit 10 or microcomputer 10a controls a hydraulic braking system 12, which is used for performing an anti-lock function, a traction control and/or an operating dynamics control; or which is an electrohydraulic braking system.

Signals, which represent the performance quantities of the vehicle, or from which the performance quantities of the vehicle can be derived, are fed via various input lines to control unit 10, and there to input circuit 10b. An input line 14 connects control unit 10 to a measuring device 16, which records the temperature of the coolant of an internal combustion engine. An input line 18 links control unit 10 to a measuring device 20, which generates a signal for the internal combustion engine's intake air temperature and/or for its ambient temperature. Via input lines 22 through 26, measuring devices 28 through 32 supply control unit 10 with signals, from which the wheel speeds of the vehicle are derived. Moreover, depending on the exemplary embodiment, additional input lines 34 through 38 are provided, which supply other vehicle performance quantities from measuring devices 40 through 44 to control unit 10, such as transverse acceleration, steering angle, yaw rate, the torque of the vehicle's drive unit, the load under which the drive unit is operated, oil temperature, the trigger signal of the pump motor of hydraulic unit 12, the voltage and/or rotational speed of such a pump, the signal from the vehicle's ignition switch, a signal which describes the operational state of an air conditioner of the vehicle, etc.

In one example embodiment, hydraulic braking system 12 includes electrically controllable valves 46 through 50, as well as at least one pump 52, which is driven by control unit 10 via its output lines 54 through 58 or 60. Within the scope of the control system according to the present invention, brake pressure is built up and reduced in the individual wheel brakes of the vehicle by actuating the pumps and valves. Furthermore, in one exemplary embodiment, the torque of the vehicle's drive unit 64 is reduced and, if indicated, increased over an output line 62.

Within the scope of the function performed by control unit 10, for example, within the scope of an anti-lock braking system, a traction control system, or an electrical braking control, control signals for building up or reducing pressure at valves 46 through 50, and trigger signals for the at least one pump 52 for supporting the pressure build-up or reduction, are generated and output as a function of the input signals. Hydraulic unit 12, which combines pump and valve arrangements, is mounted in the vehicle's engine compartment. There it is subject to various temperature sources (e.g., heat sources or heat sinks), for example, the engine, which warm it or cool it (e.g., the air flow in the engine compartment). The temperature of the hydraulic unit, which generally corresponds to the temperature of the hydraulic fluid, has, with respect to the braking system control, an effect on the pressure change dynamics, because these dynamics are dependent on the viscosity of the hydraulic fluid. Knowledge of the temperature can be used to implement measures for improving the pressure change dynamics in the wheel brakes.

In designing of a drive control system with respect to the type of control and/or the magnitude of torque reduction, the temperature of the hydraulic system plays only a minor part. With respect to the engine intervention within the scope of a traction control system, the temperature of the braking system hydraulics plays no part. However, as described below, the temperature conditions are considered in the design of the traction control system.

Figure 2:
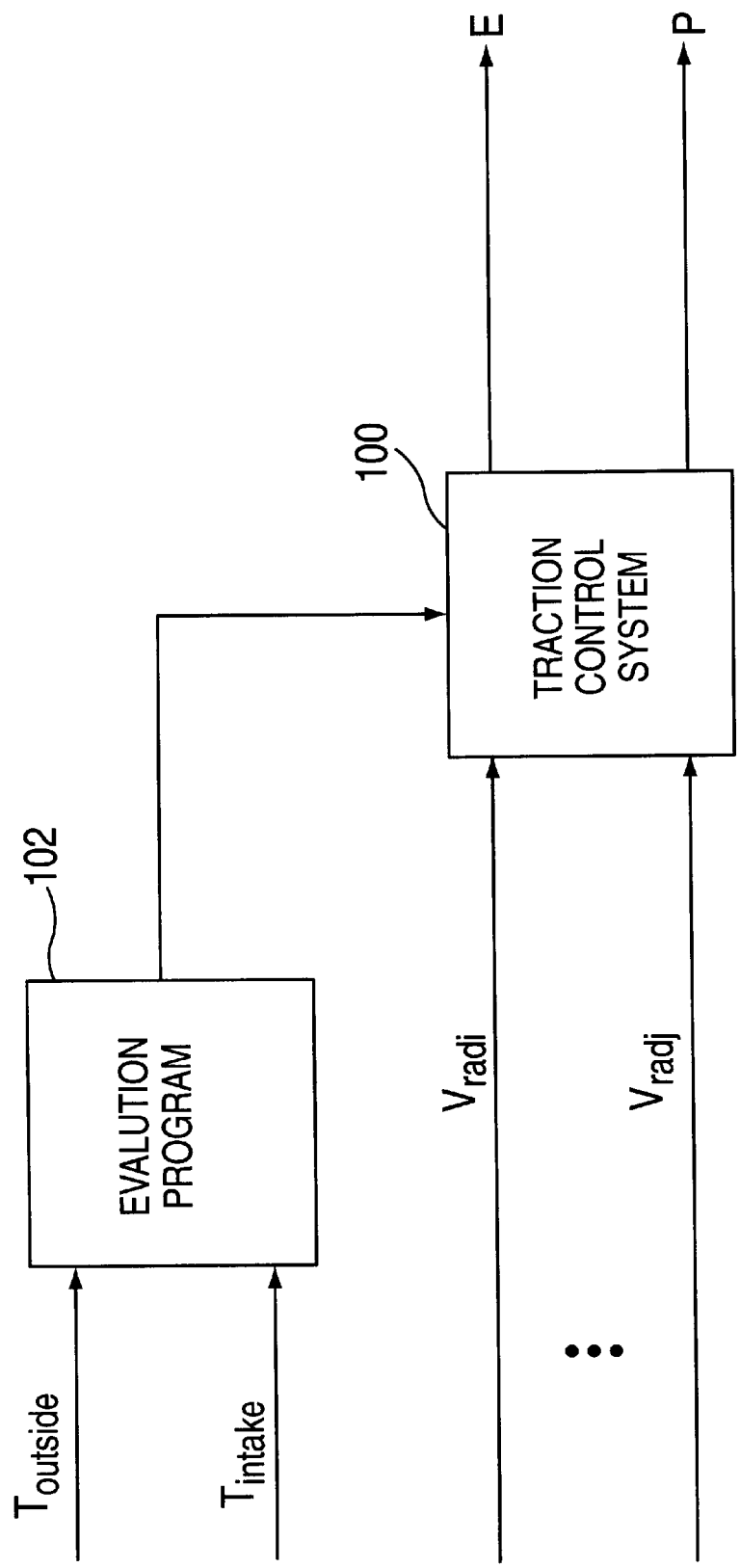
FIG. 2 depicts a flow chart for the temperature-dependent control of wheel performance according to a first example embodiment of the present invention.

FIG. 2 contains a flow chart for a program which is run from microcomputer 12. It shows a first exemplary embodiment considering the temperature conditions prevailing at the vehicle during control of the wheel performance. FIG. 2 illustrates a traction control system 100, which, in a conventional manner, generates signals for intervening in the braking system and/or engine torque on the basis of the supplied wheel speeds $V_{radi}$ to $V_{radj}$ of the individual wheels, when the wheel speed or the slip of at least one drive wheel exceeds a predefined setpoint value (slip threshold), so that incipient slippage is detected on at least this drive wheel. With respect to the brake intervention, pressure build-up pulses are output in response to exceeding of the setpoint value, while in the case of a torque intervention, torque is reduced and this subsequently increased slowly to regulate the wheel speed or slippage of at least this one driving (driven) wheel to the predefined setpoint value. The setpoint value and/or the level (magnitude) of the torque (step) changes are chosen as a compromise between favorable traction and vehicle stability. At lower outside temperatures, accompanied by a greater risk of slippery road conditions, less traction and more vehicle stability is desired, while at higher outside temperatures, vehicle stability is less important than traction due to the high coefficient of friction. To ensure a better adjustment of the traction control system to the ambient conditions, the intake air temperature $T_{intake}$ and/or the outside air temperature $T_{outside}$ are recorded in accordance with FIG. 2. These are analyzed in evaluation program 102, for example, in a comparison to a predefined threshold value or in an analysis using a table or characteristic curve. Depending on the outside or intake air temperature signal, a signal is transmitted to traction control system 100, thereby shifting the slip threshold values, i.e., the control setpoint values, at lower outside temperature or intake air temperature toward higher stability, and at high outside temperatures or intake air temperatures toward higher traction. This means that the setpoint values are lowered in response to a lower outside temperature and raised in response to a higher temperature. The setpoint values can be changed as a result of comparisons to threshold values, or they can be changed by a variable amount as a function of the outside temperature, in terms of a predefined standard value, or as a function of intake air temperature. The torque change becomes greater at a higher temperature in response to changes increasing the torque, and smaller in response to changes reducing the torque.

In addition to or alternatively to recording the intake or outside air temperature, provision is also made for detecting the engine temperature, i.e., the internal combustion engine's coolant or oil temperature, and analyzing it in evaluation program 102. If the engine temperature is low, this is indicative of a low component temperature and a cooled-off engine. In this case, an index is transmitted to traction control system 100 for changing the pressure pulse length (duration), which becomes longer at lower temperatures so as to avoid any degradation in the pressure change dynamics in the wheel brakes. Also, the engine temperature is analyzed through threshold value comparisons or within the scope of tables and characteristic curves, which are used to determine an amount by which the pressure pulse length is to be changed.

In another exemplary embodiment, instead of or in addition to influencing the intervention thresholds for a traction control system, influencing the valve timing (opening times of the valves), and/or influencing the magnitude of the torque step changes in the case of an engine intervention, the pre-charging pump is activated to improve the pressure change dynamics at low temperatures. To promote the pressure build-up, this pre-charging pump supports a return pump since supporting the return pump is only useful at low temperatures. The pre-charging pump is activated by implementing a threshold comparison of at least one of the above-mentioned temperatures to a predefined limiting value, the limiting value being selected so as to distinguish the low-temperatures range, in which the viscosity of the hydraulic oil substantially influences the dynamics of the brake pressure build-up, from the other range in which this is not the case. Besides triggering a pre-charging pump as a function of temperature, provision is, alternatively or additionally, made to pre-pressurize the brake circuit at certain temperature values. This means that by triggering the return pump and, optionally, closing the main brake line as well as the brake cylinder, a predefined pressure is built up in the main brake line, leading to a faster, driver-independent intervention in the wheel brake in question. Also in this case, the pre-pressurization is carried out when at least one of the above-mentioned temperatures falls below a predefined limiting value.

Figure 3:
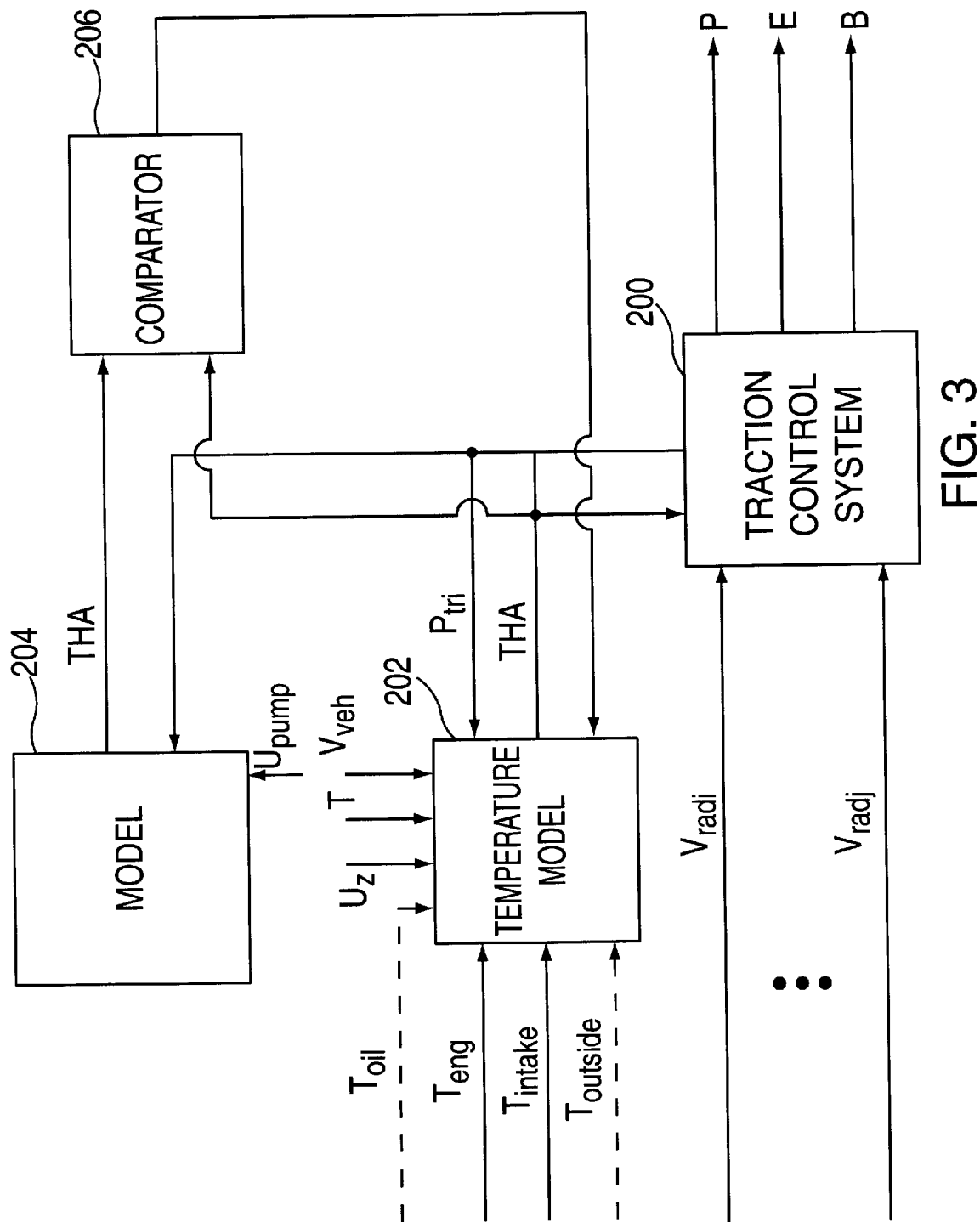
FIG. 3 illustrates a flow chart of a second exemplary embodiment of the present invention employing a model for the temperature of the hydraulic unit.

The direct evaluation of engine temperature and/or outside air or intake air temperature provides only a rough indication of the actual temperature of the hydraulic unit. The accuracy of the temperature-dependent control is improved by using a model that estimates the hydraulic temperature more precisely is used. In FIG. 3, a flow chart shows a second exemplary embodiment of a program in microcomputer 10a, in which a model is used to determine temperature information pertaining to the hydraulic unit as a function of at least one of the mentioned temperature variables evaluated during control of the wheel performance.

In FIG. 3, a traction control system 200 is also provided which, depending on the wheel speeds $V_{radi}$ through $V_{radj}$ controls braking system B, engine E, and, in some instances, at least one pump P. In addition, traction control system 200 is fed a signal value THA, which represents the temperature of the hydraulic unit, as a function of which the above-mentioned measures for changing the pressure pulse, changing the slip threshold, pre-pressurizing the circuit, and/or activating the pre-charging pump are carried out. Temperature THA of the hydraulic unit is estimated in temperature model 202 as a function of selected performance quantities. In FIG. 3, examples of the performance quantities considered include coolant temperature $T_{eng}$ or oil temperature $T_{oil}$ of an internal combustion engine, the intake air temperature $T_{intake}$, the vehicle velocity (reference velocity) $V_{veh}$, absolute time T, ignition switch signal Uz, a signal for pump motor triggering $P_{tr}$ coming from controller 200, and/or an operating signal for the vehicle's air conditioner. Using the model, the temperature of the hydraulics is determined by approximation as a function of these variables. An example of a model is described in the following on the basis of the flowchart in FIG. 4. The model is, for example, a correlation of the hydraulic temperature and the input temperature quantities, special operating conditions also being considered. Furthermore, one example embodiment includes another model 204 which estimates the temperature of the hydraulics on the basis of the pump's after-run behavior. The two hydraulic temperatures are compared to one another to check for plausibility in a comparator 206. If the two temperatures deviate significantly from one another, then the temperature-dependent control is discontinued, because an error is then assumed in the area of one of the temperature models. As an alternative, the temperature model calculation is resumed with the predetermined starting values.

Figure 4:
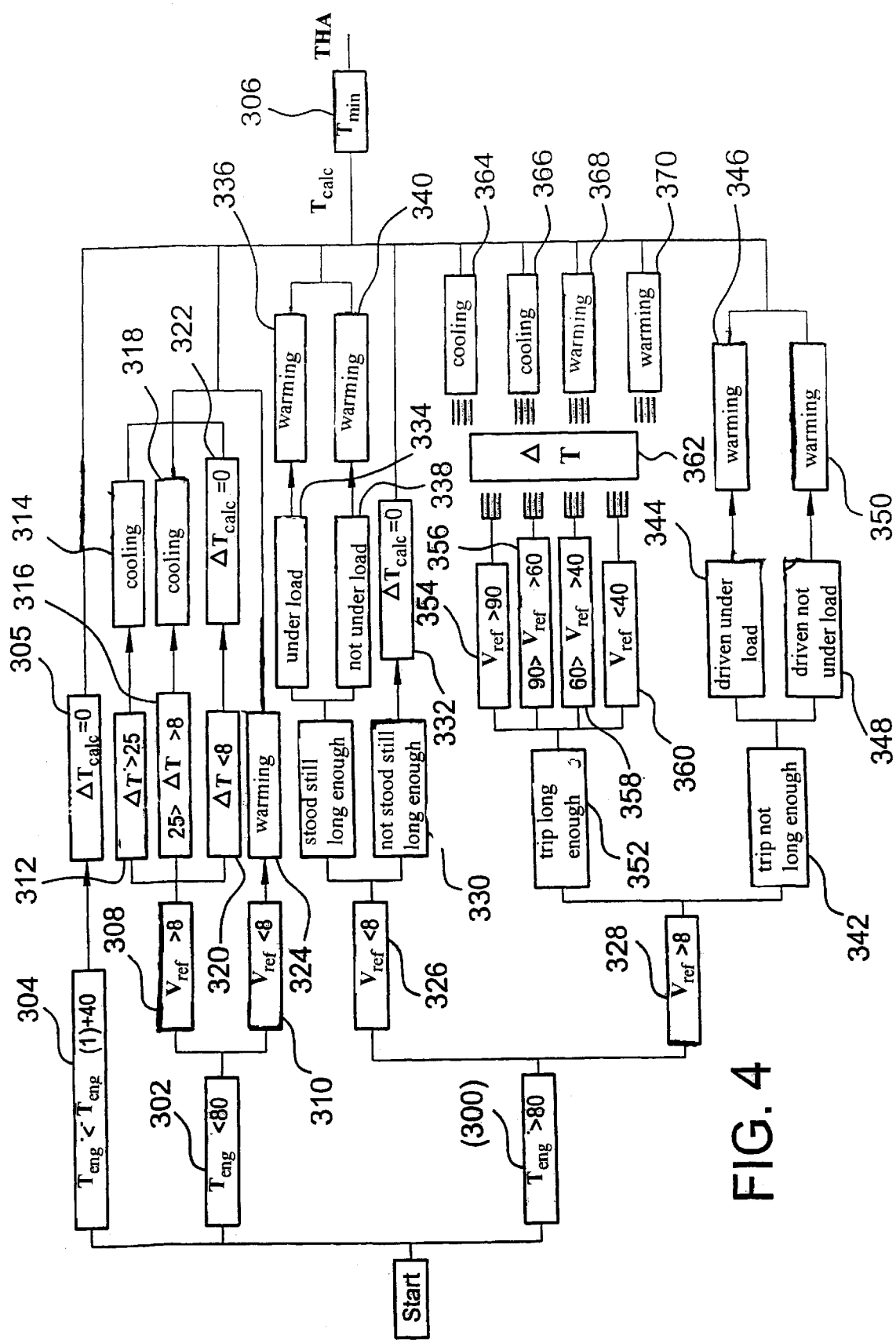
FIG. 4 shows a flow chart of an example embodiment of the temperature model according to the present invention.

The temperature model used to determine the hydraulic temperature is shown by the flow chart in FIG. 4. The model is based on recursive equations, the warming or cooling of the hydraulics being obtained on the basis of a temperature calculated in a previous program step and on the basis of a variable amount specially adjusted to the current operating state. This variable amount is obtained from equations having predefinable coefficients, which are selected depending on the current operating state of the vehicle.

After switching on the supply voltage, it is checked in first steps if the engine temperature is less than 40° C. above the starting temperature (304). If this is the case, the change in the calculated temperature value $\Delta T_{calc}$ is set to zero, and thus, the estimated hydraulic temperature is set to the previous value (starting value). In one advantageous exemplary embodiment, the starting value is derived from the model value existing at the start. Afterwards and in accordance with step 306, the temperature value is, if necessary, subjected to a predefined minimum limiting action, and the temperature is output as the hydraulic temperature.

If the temperature rises by more than 40° C., it is checked whether the engine temperature $T_{eng}$ is above a first limiting value (80) (step 300) or below this limiting value (302). If the engine temperature is below 80° C., ie., if the vehicle is being operated with a cold engine, then two states are differentiated. One is, namely, the state during which the vehicle is moving, i.e., the vehicle's reference velocity and, thus, the vehicle's velocity is greater than a limiting value (e.g., 8 km/h) (step 308). The other is the state during which the vehicle is standing still, i.e., the velocity is lower than this limiting value (310). If the vehicle's velocity is less than this limiting value, it is standing still, so that the recursive equations are calculated in accordance with step 324 using the constants designated for this operating state, and in view of a warming of the hydraulic unit. The change-in-temperature value is then added to the previous value to obtain the value $T_{calc}$. The temperature value $T_{calc}$ determined after solving the recursive equation is limited in step 306, if indicated, to a minimum value $T_{min}$, if necessary, and outputted as temperature value THA.

If the vehicle's reference velocity is greater than reference value (308), then a total of three other operating states are differentiated. The difference $\Delta T$ between calculated temperature $T_{calc}$ and outside temperature $T_{outside}$ or intake air temperature $T_{intake}$ is calculated and compared to predefined limiting values. If the temperature difference is greater than a first limiting value (25°, 312), then the hydraulic unit cools off, and the corresponding recursive equation is used to calculate current temperature (314). The equivalent is valid, with other parameters, when the temperature difference lies between the first and a second limiting value (25° and 8°) (316,318), while the hydraulic unit is neither cooled nor warmed in response to a temperature less than the second limiting value (320), so that the previously existing temperature is retained (322). The calculated temperature value is limited 306, if indicated, and output.

If the engine temperature is above its limiting value (300), then the existence of one of the operating states known from steps 308 and 310 is checked (step 326, 328). If the vehicle's reference velocity is less than a second limiting value (for example 8 km/h, while, it can differ from the limiting value in 310), then the vehicle is standing still. The time during which the vehicle is standing still is essential for changing the hydraulic temperature. If the vehicle has not yet stood still for any length of time (step 330, time T is less than a limiting value), then the previously calculated value is retained (step 332). On the other hand, if the vehicle has stood still longer than the predetermined time, it is checked whether or not the vehicle is being operated under load (e.g., idling with a load, such as an air conditioner). If the vehicle is operated under load (step 334), then the equation for the warming of the hydraulics having parameters adjusted to this operating state is used to calculate the hydraulic temperature (336). If the engine is not operated under load ("true idling", step 338), then the corresponding recursive equation having parameters adjusted to this operating state is used to calculate the increase in the hydraulic temperature (340). The calculated temperature $T_{calc}$ is limited, if indicated, and output.

If the vehicle is being driven, i.e., if the reference velocity is greater than a first limiting value (e.g., 8 km/h, step 328), then the time that the trip takes is compared to limiting values to ascertain whether the trip has lasted long enough to make it sufficiently probable that the hydraulics have been cooled off by the air flow. If the preselected time has not been exceeded, ie., the vehicle has not yet been driven a long time (step 342), then it is checked whether the vehicle is being driven under load (driving case) or not (e.g., deceleration). If the vehicle is driven under load (step 344), then a warming equation provided with adjusted parameters is used to determine the hydraulic temperature (346), in the same way as when the vehicle is not driven under load (348, 350). In this context, different, adjusted parameter sets are used for the warming equation. The calculated temperature $T_{calc}$ is limited, if indicated, and output.

If the trip lasts longer than a predefined time (352), then various reference velocity ranges for the vehicle are differentiated. In this context, it was derived from one exemplary embodiment that four velocity ranges are practical (e.g., reference velocity>90 km/h, between 90 and 60 km/h, between 60 and 40 km/h, and less than 40 km/h). In all of these velocity ranges, the difference between the calculated temperature and the outside air or intake air temperature is calculated. Depending on the application case, various temperature ranges are differentiated, in which one ascertained a cooling of the hydraulic unit or a warming of the hydraulic unit. Depending on the temperature range, the appropriate equations having corresponding parameters representing the cooling and warming behavior are used (see steps 364 through 370). The calculated value is limited, if indicated, and output.

Using the illustrated model, the change in temperature of the hydraulics is estimated and the calculated temperature is corrected to match the corresponding actual curves. It varies from one application case to another how the various operating areas are differentiated and how the parameters of the recursive equation are chosen for calculating the temperature. In each instance, there must be an adaptation to the vehicle in question.

Other special influences affect the temperature of the hydraulic unit. For example, the internal warming of the hydraulic unit caused by pump operation plays a role, which is taken into account in calculating the temperature by assuming a predefined warming as a function of the pump's operating time.

The described measures, which are carried out as a function of measured temperature quantity (quantities), are applied individually or in any desired combination, depending on the application.

The measures, with their associated advantages, affecting engine intervention and activation of the traction control system are also applied to vehicles having braking systems that employ electromotive brake application.

What is claimed is:

1. A method for controlling a wheel performance of a vehicle, the wheel performance being varied by at least one of an operating dynamics system, an electrical brake control system, and at least one traction control system, the method comprising:

measuring at least one quantity representing one of: i) an ambient temperature, and ii) an intake air temperature of an internal combustion engine;

forming a signal from the at least one quantity, the signal indicating at least one of: i) the ambient temperature, and ii) the intake air temperature of the internal combustion engine;

adjusting the at least one traction control system as a function of the signal, the at least one traction control system being adjusted to emphasize stability when the signal indicates a low temperature of the at least one of: i) the ambient temperature, and ii) the intake air temperature of the internal combustion engine, and to emphasize traction when the signal indicates a high temperature of the at least one of: i) the ambient temperature, and ii) the intake air temperature of the internal combustion engine.

2. The method according to claim 1, further comprising:

performing one of: i) changing slip thresholds, and ii) altering a magnitude of torque changes, to improve one of the stability and traction, wherein, in response to a change of the signal indicating a temperature increase of the at least one of: i) the ambient temperature, and ii) the intake air temperature of the internal combustion engine, the slip thresholds are increased.

3. A method for controlling a wheel performance of a vehicle, the wheel performance being varied by at least one of an operating dynamics system and an electrical brake control system, the method comprising:

activating at least one of a pre-charging pump, a return pump and valves to one of build up and reduce a pressure in a brake circuit of the vehicle, the brake circuit including the pre-charging pump, the return pump and the valves, the valves being activated by an opening pulse;

measuring at least one quantity representing one of: i) a coolant temperature, ii) an ambient temperature, and iii) an intake air temperature, of an internal combustion engine;

performing, as a function of the measured quantity, at least one of: i) changing a length of the opening pulse, ii) activating the pre-charging pump, and iii) pre-pressurizing the brake circuit using at least one of the pre-charging pump and the return pump; and estimating a temperature of a hydraulic unit as a function of the at least one quantity representing one of: i) the coolant temperature, ii) the ambient temperature, and iii) the intake air temperature, of the internal combustion engine.

4. The method according to claim 3, wherein the estimating step includes estimating the temperature of the hydraulic unit using a temperature model.

5. The method according to claim 4, wherein the temperature model includes recursive equations which represent at least one of a warming and a cooling-off of the hydraulic unit, the temperature model having changeable parameters.

6. The method according to claim 5, wherein the estimating step further includes using at least one of the equations, the at least one of the equations and the equation parameters being selected as a function of an operating state of the vehicle, the equation parameters being selected as a function of the operating state of the vehicle.

7. The method according to claim 6, further comprising:

determining the operating state of the vehicle as a function of at least one of: i) a temperature of the engine, ii) a velocity of the vehicle, and iii) the at least one measured quantity.

8. The method according to claim 7, wherein the determining step includes determining the operating state of the vehicle as a function of at least one of: i) a period of time in which the vehicle is driven, ii) a period of time in which the vehicle stands still, iii) a load under which the vehicle is operated.

9. The method according to claim 3, wherein the estimated temperature is limited to a minimum value.

10. A device for controlling a wheel performance of a vehicle, the wheel performance being varied by at least one of an operating dynamics system and an electrical brake control system, the device comprising:

a traction control system which is activated when a wheel slippage exceeds a predefined slip threshold, and which reduces a torque of a drive unit, the traction control system increasing the torque by variable amounts after reducing the torque; and a control unit which records a signal, the signal indicating at least one of: i) an ambient temperature, and ii) an intake air temperature of an internal combustion engine, the control unit adjusting the traction control system as a function of the signal to emphasize stability when the signal indicates a low temperature of the at least one of: i) the ambient temperature, and ii) the intake air temperature of the internal combustion engine, and traction when the signal indicates a high temperature of the at least one of: i) the ambient temperature, and ii) the intake air temperature of the internal combustion engine.

11. A device for controlling a wheel performance of a vehicle, the wheel performance being varied by at least one of an operating dynamics system and an electrical brake control system, the device comprising:

a brake circuit including a return pump to increase a pressure in the brake circuit; and a control unit which detects at least one quantity representing one of: i) a coolant temperature, ii) an ambient temperature, and iii) an intake air temperature of an internal combustion engine, the control unit performing, as a function of the at least one quantity representing one of: i) the coolant temperature, ii) the ambient temperature, and iii) the intake air temperature of the internal combustion engine, a pre-pressurizing of the brake circuit by activating the return pump.

* * * * *